(12) United States Patent
Thies

(10) Patent No.: US 9,027,323 B2
(45) Date of Patent: May 12, 2015

(54) BLOOM MIXER FOR A TURBOFAN ENGINE

(75) Inventor: Robert Thies, Schwielowsee (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 811 days.

(21) Appl. No.: 13/231,409

(22) Filed: Sep. 13, 2011

(65) Prior Publication Data
US 2012/0067025 A1 Mar. 22, 2012

(30) Foreign Application Priority Data
Sep. 16, 2010 (DE) .......................... 10 2010 045 697

(51) Int. Cl.
F02K 1/48 (2006.01)
F02K 1/38 (2006.01)
F02K 3/075 (2006.01)

(52) U.S. Cl.
CPC . *F02K 1/386* (2013.01); *F02K 1/48* (2013.01); *F02K 3/075* (2013.01); *F05D 2240/126* (2013.01)

(58) Field of Classification Search
CPC ........... F02K 1/386; F02K 1/48; F02K 3/075; F05D 2240/126
USPC ................. 60/226.1, 226.3, 262; 239/265.19, 239/265.33, 265.37
See application file for complete search history.

(56) References Cited

U.S. PATENT DOCUMENTS

| 4,422,524 | A | * | 12/1983 | Osborn | 239/265.13 |
|---|---|---|---|---|---|
| 4,845,939 | A | * | 7/1989 | Jordan et al. | 60/226.1 |
| 5,117,628 | A |  | 6/1992 | Koshoffer |  |
| 5,136,840 | A | * | 8/1992 | Nash | 60/226.3 |
| 5,307,624 | A | * | 5/1994 | Even-Nur et al. | 60/226.3 |
| 5,694,767 | A | * | 12/1997 | Vdoviak et al. | 60/226.3 |
| 5,771,681 | A |  | 6/1998 | Rudolph |  |
| 5,775,098 | A | * | 7/1998 | Philippona | 60/226.3 |
| 5,899,058 | A | * | 5/1999 | Narcus et al. | 60/226.3 |
| 6,070,407 | A | * | 6/2000 | Newton | 60/226.1 |
| 7,762,057 | B2 | * | 7/2010 | Sloan et al. | 60/226.1 |
| 8,181,441 | B2 | * | 5/2012 | Smith | 60/226.3 |
| 2008/0302083 | A1 |  | 12/2008 | Sloan et al. |  |
| 2009/0158704 | A1 |  | 6/2009 | Whurr et al. |  |
| 2010/0126183 | A1 |  | 5/2010 | Conete et al. |  |

FOREIGN PATENT DOCUMENTS

DE 4028259 8/1991

OTHER PUBLICATIONS

German Search Report dated Oct. 14, 2011 for counterpart foreign application.

* cited by examiner

*Primary Examiner* — J. Gregory Pickett
(74) *Attorney, Agent, or Firm* — Timothy J. Kilma; Shuttleworth & Ingersoll, PLC

(57) ABSTRACT

An adjustable bloom mixer for a turbofan engine for setting a mixing ratio, adapted to the respective flight condition, between cold airflow in the bypass duct and hot airflow in the core flow duct includes an air-guiding element (13) arranged upstream of a thin-walled, corrugated part (6*b*) of the bloom mixer (6) for branching off a cold partial airflow and/or a hot partial airflow from the bypass duct and from the core flow duct of the engine. An air control device (14) is assigned to the air-guiding element (13) for leading the branched-off cold airflow or hot airflow along the inner surface and/or the outer surface of the bloom mixer (6) in order to deflect its corrugated part (6*b*) radially inwards or outwards on the basis of a temperature difference between an inner and an outer surface effected by the hot and/or cold partial airflow.

Figure 1:
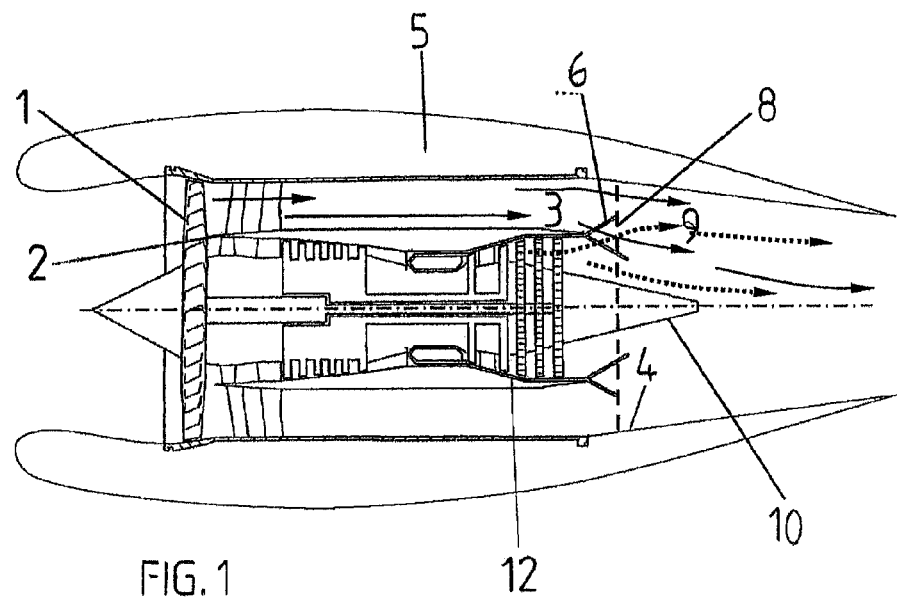

7 Claims, 2 Drawing Sheets

BLOOM MIXER FOR A TURBOFAN ENGINE

This application claims priority to German Patent Application DE102010045697.7 filed Sep. 16, 2010, the entirety of which is incorporated by reference herein.

This invention relates to an adjustable bloom mixer for a turbofan engine for setting a mixing ratio, adapted to the respective flight condition, between the cold airflow from the bypass duct and the hot airflow from the core flow duct.

It is known that the efficiency of turbofan engines can be improved by mixing the hot gas flow of the core engine with the cold mass flow of the bypass duct, and only then relaxing the mixed gas flow. A further advantage of the mixing of the two gas flows is—in particular when the aircraft takes off—the jet noise reduction it involves. For mixing the two airflows, bloom mixers are usually used which include a surrounding sheet-metal shell with bulges alternatingly curving radially inwards and outwards and extending in the longitudinal direction. The respective shape, length and number of bulges or ducts formed between said bulges influences the mixing effect of the bloom mixer when mixing the cold gas flow flowing off between its outer surface and the inner wall of the engine nacelle (cold flow cross-section) and the hot gas flow flowing off between its inner surface and the exhaust cone (hot flow cross-section). The cold flow cross-section and the hot flow cross-section of a bloom mixer are furthermore not completely constant for operating reasons, since its rotationally symmetrical part adjoining the mixing area of the bloom mixer in the upstream direction can be subjected to a differing cold or hot gas volume flow, respectively, depending on the flight condition. Linked to this are a variable expansion behavior of the bloom mixer and a resultant uncontrolled change in the mixing ratio between the hot and the cold airflows.

The size of the cold flow cross-section influences the fan flutter of the engine, meaning that the larger the cold flow cross-section, the less load on the fan and the less the risk of fluttering of the fan. Furthermore, a low cold flow cross-section at the mixer in favor of a larger hot flow cross-section results in a reduction of the thrust and in an increase in the noise level. On the other hand, under certain flying conditions a reduced cold flow cross-section can also have an advantageous effect on the improvement of the thrust, without entering the critical flutter range. For that reason, the usually fixed ratio between the cold gas cross-section and the hot gas cross-section is only a compromise for all flight conditions occurring.

To allow adaptation of the mixing ratio between the cold gas flow and the hot gas flow to differing flight conditions too, U.S. Pat. No. 5,771,681 proposes an adjustable mixing apparatus for gas-turbine engines for variable mixing of the cold bypass airflow with the hot core airflow, including a plurality of segments succeeding one another in the circumferential direction, held in an articulated manner and adjustable into both an outer and an inner position, in order to alter the mixing ratio between the hot and the cold gas flow. The maintenance expenditure and the costs for the mixing apparatus, which includes a plurality of components, are however high.

Furthermore, devices for controlled setting of the mixing ratio have already been proposed, which exploit the elasticity of the known bloom mixers made in one piece from sheet metal and which act with mechanical means on the bloom mixer such that the ratio of the cold flow cross-section to the hot flow cross-section is altered. However, in this case too the expenditure for the mechanical setting elements acting on the bloom mixer is comparatively high.

The present invention, in a broad aspect, provides an adjustable bloom mixer for a turbofan engine such that the mixing ratio between the cold gas flow and the hot gas flow can be optimally adapted to the respective flight condition at low expense.

It is a particular object of the present invention to provide solution to the above problems by a bloom mixer designed in accordance with the features described herein.

Advantageous or useful developments of the present invention become apparent from the present description.

The core of the invention is that part of the cold airflow and/or of the hot airflow is passed over the inner surface and/or the outer surface of the bloom mixer, and that the bloom mixer is thus radially adjusted outwards or inwards due to the temperature difference at the inner and outer surfaces and due to the expansion behavior this entails.

In accordance with the invention, the adjustable bloom mixer includes an air-guiding element arranged upstream of the thin-walled, corrugated part of the bloom mixer for branching off a cold partial airflow and/or a hot partial airflow from the bypass duct and from the core flow duct of the engine, and an air control device assigned to the air-guiding element for leading the branched-off cold airflow or hot airflow along the inner surface and/or the outer surface of the bloom mixer in order to deflect its corrugated part radially inwards or outwards on the basis of the temperature difference between the inner and the outer surface effected by the hot and/or cold partial airflow.

In a further embodiment of the invention, the air control device includes a continuous baffle ring plate projecting substantially at an angle from the rotationally symmetrical part of the bloom mixer and having first cold air passage openings arranged at regular intervals and second cold air passage openings formed upstream of the baffle ring plate in the rotationally symmetrical part. The first and second cold air passage openings are alternately closable for supplying a cold partial airflow to the inner surface or the outer surface of the corrugated part of the bloom mixer. The air control device furthermore includes a deflector plate section adjoining the baffle plate in the downstream direction. A continuous deflector plate facing upstream and serving as an air-guiding element to branch off the cold partial airflow is furthermore connected to the baffle ring plate.

In a further embodiment of the invention, a deflector plate section facing downstream adjoins the baffle ring plate for guiding the cold partial airflow supplied via the first cold air passage openings to the outer surface of the bloom mixer.

In an embodiment of the invention, the deflector plate and the deflector plate section form a covering hood surrounding the baffle ring plate in ring form.

In a further embodiment of the invention, first and second cold air passage openings are arranged offset to one another and are alternately closable by first and second closure flaps fitted in offset form onto a rotatable closure ring.

Figure 3:
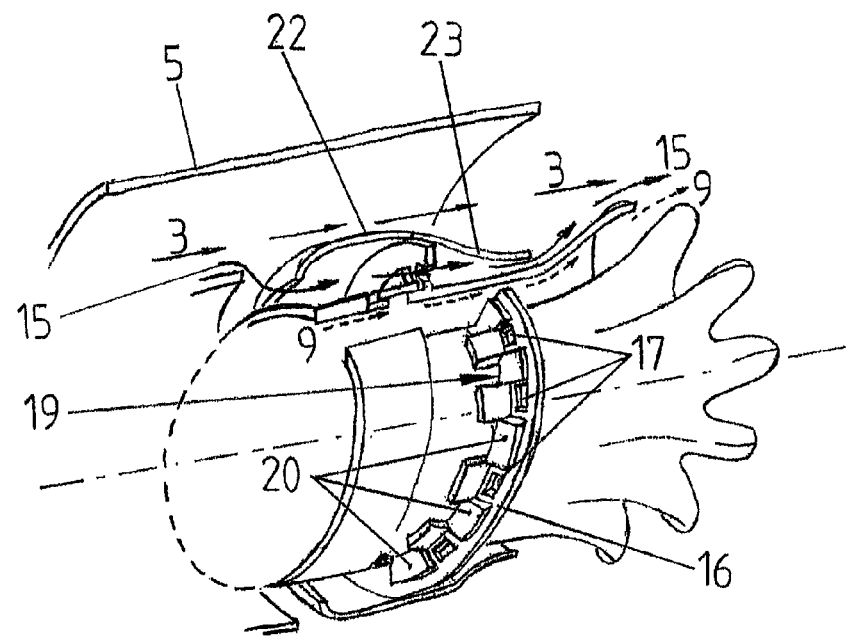
Figure 4:
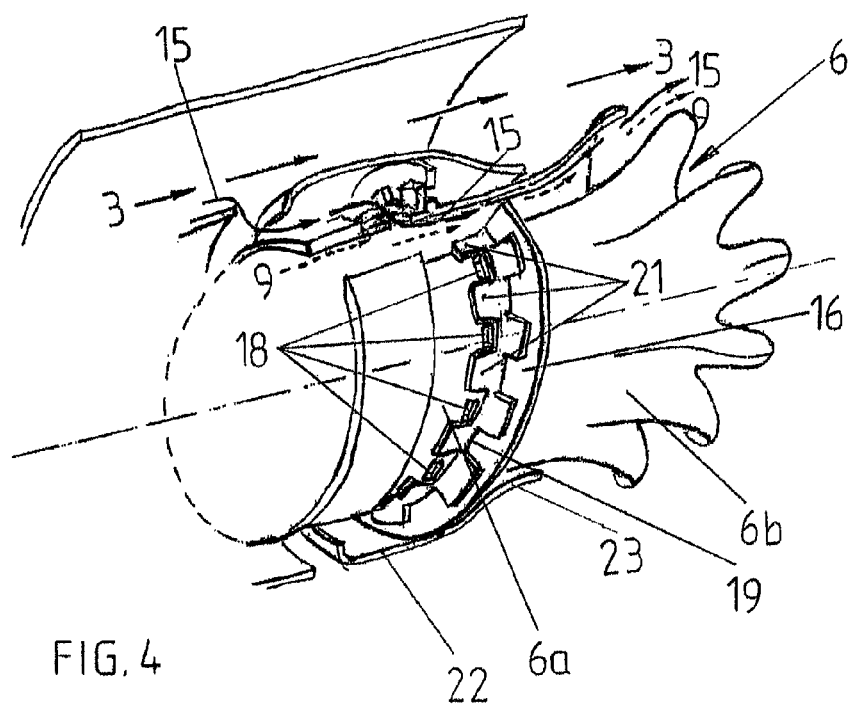

The present invention is more fully described in light of the accompanying Figures showing a preferred embodiment. In the Figures, FIG. 1 is a schematic representation of a turbofan engine with long engine nacelle and a bloom mixer for mixing the cold airflow with the hot airflow, FIG. 2 is a representation of the inventive principle with a bloom mixer deflected radially inwards or outwards by the cold and/or hot airflow in a controlled way, FIG. 3 is a perspective representation of a bloom mixer with a control device assigned to the latter for guiding the cold air along the outer surface of the bloom mixer, FIG. 4 shows the bloom mixer with a control device as per FIG. 3, however with the cold air being guided along the inner surface of the bloom mixer.

As FIG. 1 shows, the airflow generated by the fan 1 of a turbofan engine is split at a flow divider 2 and passes on the one hand via the bypass duct as a cold airflow 3 into the cold flow cross-section 7 of the mixing plane 8 present between the inner wall 4 of the engine nacelle 5 and the outer surface of the corrugated part 6b of the bloom mixer 6. The other part of the airflow guided in the core engine casing 12 passes as a hot airflow 9 to the hot flow cross-section 11 of the mixing plane 8 between the inner surface of the bloom mixer 6 and the exhaust cone 10.

The mixing ratio between the cold airflow 3 and the hot airflow 9 should be able to be changed to match the flight condition by radial movement inwards or outwards of the continuous, corrugated wall—of thin-walled elastic sheet—of the bloom mixer 6, in order to prevent fan flutter, to minimize engine noise or to influence the thrust.

Figure 2:
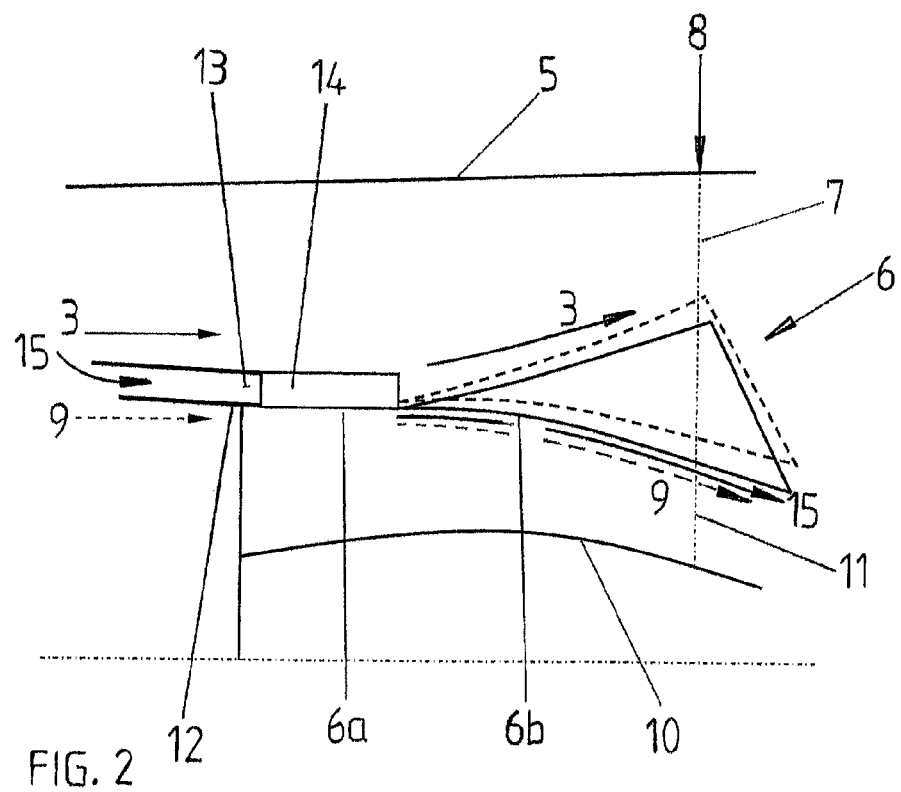

According to the principle drawing shown in FIG. 2 of a bloom mixer 6 arranged concentrically between the inner wall 4 of the engine nacelle 5 and the exhaust cone 10, an air-guiding element 13 and an air control device 14 are assigned to the corrugated part 6b—radially adjustable outwards or inwards thanks to its thin-walled design—of the bloom mixer 6 at its rotationally symmetrical part 6a. With the air-guiding element 13, cold air from the bypass duct and/or hot air from the core engine casing 12 is branched off from the cold airflow 3 and/or from the hot airflow 9, and selectively passed by the air control device 14 to the inner surface and/or to the outer surface of the corrugated bloom mixer 6. Depending on the different heating or cooling of the inner surface and the outer surface of the bloom mixer 6 effected by the air control device 14, or on the temperature difference between the inner and the outer surface and the correspondingly different expansion, the bloom mixer 6 moves radially inwards or outwards. As a result, the cold flow cross-section 7 and the hot flow cross-section 11 change, meaning that a temperature reduction on the inner surface of the bloom mixer 6 effects a radial movement of the bloom mixer inwards, and an increase of the cold flow cross-section 7 or a reduction of the hot flow cross-section 11. On the other hand, greater heating of the inner surface of the bloom mixer, if for example no branched-off cold air is passed to the inner surface of the bloom mixer 6, leads to a radial outward movement of the bloom mixer 6 due to the comparatively low temperature on the outer surface of the bloom mixer, so that the cold flow cross-section 7 is reduced and the hot flow cross-section 11 correspondingly increased.

FIGS. 3 and 4 show a specific design example of the general embodiment, represented in FIG. 2, of a variable bloom mixer 6 whose radial position is changed under the effect of a branched-off cold partial airflow 15 of the cold airflow 3 guided along the inner surface of the bloom mixer 6. The aforementioned air control device 14 includes a baffle ring plate 16 fitted upstream of the bloom mixer 6 and to its rotationally symmetrical part 6a, and projecting into the bypass duct, having first cold air passage openings 17 provided at regular intervals and second cold air passage openings 18 provided offset thereto in the wall of the core engine casing 12 upstream of the baffle ring plate 16. A closure ring 19 is rotatably mounted on the baffle ring plate 16 and on the core engine casing 12 and includes first and second closure flaps 20, 21 arranged at a certain distance from the first and second cold air passage openings 17, 18 and at angles relative to one another. The closure ring 19 can be set such that the first closure flaps 20 close the first cold air passage openings 17, or the second closure flaps 21 close the second cold air passage openings 18. The aforementioned air-guiding element 13 is a deflector plate 22 arranged in the bypass duct and adjoining the baffle ring plate 16 in the upstream direction. With the deflector plate 22, a cold partial airflow 15 is branched off from the bypass duct and is passed, depending on the position of the closure ring 19, through either the first or the second cold air passage openings 17 or 18.

In the representation shown in FIG. 3, the closure ring 19 is in a position closing the second cold air passage openings 18. The cold partial airflow 15 branched off upstream of the air control device 14 by the deflector plate 22 flows through the first cold air passage openings 17 and, by the deflector plate section 23 adjoining the deflector plate 22 downstream of the baffle ring plate 16, is passed closely over the outer surface of the bloom mixer. While the hot airflow 9 heats the inner surface of the bloom mixer 6, its outer surface is cooled at the same time, so that the bloom mixer 6 is deflected into a radially outer position.

FIG. 4 shows the air control device 14 in a state in which the closure ring 19 closes the first cold air passage openings 17 and releases the second cold air passage openings 18, so that the cold partial airflow 15 branched off from the cold airflow 3 by the deflector plate 22 can flow off along the inner surface of the bloom mixer 6 and in so doing cools the otherwise hot inner surface of the bloom mixer 6. The bloom mixer 6 is thus adjusted solely due to the cooling effect of the cold airflow 3 into a position differing from that in FIG. 3 and deflected radially inwards to form an enlarged cold flow cross-section 7 and reduced hot flow cross-section 11 in the mixing plane 8.

The invention is not limited to the previously explained exemplary embodiment. Within the scope of the basic idea of the invention, whereby due to cooling and/or heating of the outer or inner surfaces of the bloom mixer with the cold and/or hot airflow, its radially inward or outward adjustment—and hence a change in the mixing ratio and an influencing of the thrust, the engine noise and the fan flutter—can be achieved, various modifications relating to the type of cold or hot air supply to the inner or outer surfaces of the bloom mixer are conceivable.

LIST OF REFERENCE NUMERALS

1 Fan
2 Flow divider
3 Cold airflow
4 Inner wall of 5
5 Engine nacelle
6 Bloom mixer (6a: rotationally symmetrical part of 6; 6b: corrugated part of 6)
7 Cold flow cross-section in 8
8 Mixing plane
9 Hot airflow
10 Exhaust cone
11 Hot flow cross-section in 8
12 Core engine casing
13 Air-guiding element
14 Air control device
15 Cold partial airflow
16 Baffle ring plate
17 First cold air passage openings
18 Second cold air passage openings
19 Closure ring
20 First closure flaps
21 Second closure flaps
22 Deflector plate
23 Deflector plate section

What is claimed is:

1. An adjustable bloom mixer for a turbofan engine for setting a mixing ratio between a cold airflow from a bypass duct and a hot airflow from a core flow duct to adjust a radial dimension of a bloom mixer, comprising:
   a bloom mixer having a rotationally symmetrical part and a thin-walled, corrugated part having an inner surface and an outer surface;
   an air-guiding element arranged upstream of the thin-walled, corrugated part for branching off at least one chosen from a group consisting of a cold partial airflow from a bypass duct and a hot airflow from a core flow duct of the engine;
   an air control device downstream of the air-guiding element for leading the at least one chosen from the branched-off cold partial airflow or hot airflow along at least one chosen from the inner surface and the outer surface of the bloom mixer to deflect the corrugated part radially inwards or outwards due to one chosen from thermal contraction and thermal expansion resulting from a temperature difference between the inner surface and the outer surface effected by the at least one chosen from the cold partial airflow and the hot airflow;
   a plurality of first cold air passage openings arranged at regular intervals on the air control device;
   a plurality of second cold air passage openings arranged at regular intervals on the air control device;
   a rotatable closure ring having a plurality of first closure flaps and a plurality of second closure flaps offset from one another;
   wherein the first and second cold air passage openings are also arranged offset to one another and are alternately closable by the first closure flaps and the second closure flaps, respectively, via rotation of the closure ring.

2. An adjustable bloom mixer for a turbofan engine for setting a mixing ratio between a cold airflow from a bypass duct and a hot airflow from a core flow duct to adjust a radial dimension of a bloom mixer, comprising:
   a bloom mixer having a rotationally symmetrical part and a thin-walled, corrugated part having an inner surface and an outer surface;
   an air-guiding element arranged upstream of the thin-walled, corrugated part for branching off at least one chosen from a group consisting of a cold partial airflow from a bypass duct and a hot airflow from a core flow duct of the engine;
   an air control device downstream of the air-guiding element for leading the at least one chosen from the branched-off cold partial airflow or hot airflow along at least one chosen from the inner surface and the outer surface of the bloom mixer to deflect the corrugated part radially inwards or outwards due to one chosen from thermal contraction and thermal expansion resulting from a temperature difference between the inner surface and the outer surface effected by the at least one chosen from the cold partial airflow and the hot airflow;
   wherein the air control device includes:
      a continuous baffle ring plate projecting substantially at an angle from the rotationally symmetrical part of the bloom mixer and having a plurality of first cold air passage openings arranged at regular intervals;
      a plurality of second cold air passage openings formed upstream of the baffle ring plate in the rotationally symmetrical part; the first and second cold air passage openings being alternately closable for supplying a cold partial airflow to the inner surface or the outer surface of the corrugated part of the bloom mixer;
      a deflector plate section adjoining the baffle plate in a downstream direction having a continuous deflector plate facing upstream and serving as the air-guiding element to branch off the cold partial airflow being connected to the baffle ring plate.

3. The bloom mixer of claim 2, wherein the deflector plate section facing downstream adjoins the baffle ring plate for guiding the cold partial airflow supplied via the first cold air passage openings to the outer surface of the bloom mixer.

4. The bloom mixer of claim 3, wherein the deflector plate and the deflector plate section form a covering hood surrounding the baffle ring plate in ring form.

5. The bloom mixer of claim 4, and further comprising:
   a rotatable closure ring having a plurality of first closure flaps and a plurality of second closure flaps offset from one another;
   wherein the first and second cold air passage openings are also arranged offset to one another and are alternately closable by the first closure flaps and the second closure flaps, respectively, via rotation of the closure ring.

6. The bloom mixer of claim 2, wherein the deflector plate and the deflector plate section form a covering hood surrounding the baffle ring plate in ring form.

7. The bloom mixer of claim 6, and further comprising:
   a rotatable closure ring having a plurality of first closure flaps and a plurality of second closure flaps offset from one another;
   wherein the first and second cold air passage openings are also arranged offset to one another and are alternately closable by the first closure flaps and the second closure flaps, respectively, via rotation of the closure ring.

* * * * *